March 9, 1965 D. S. BLISS ETAL 3,172,495
CONTROL OF FLUID CURTAIN FLOW IN AIR CUSHION VEHICLES
Filed Dec. 28, 1962 2 Sheets-Sheet 1
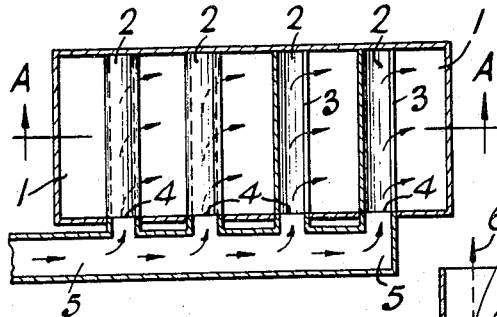
FIG.1.
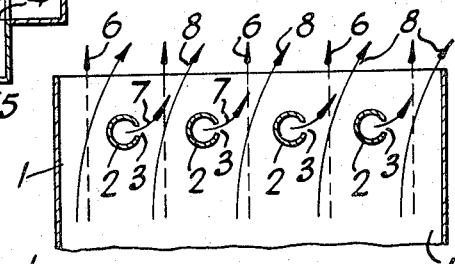
FIG.2.
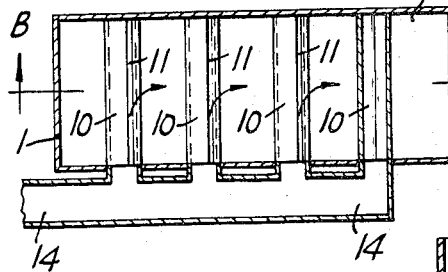
FIG.3.
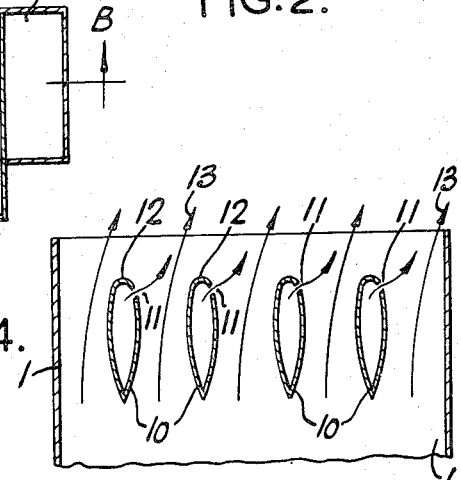
FIG.4.
FIG.5.
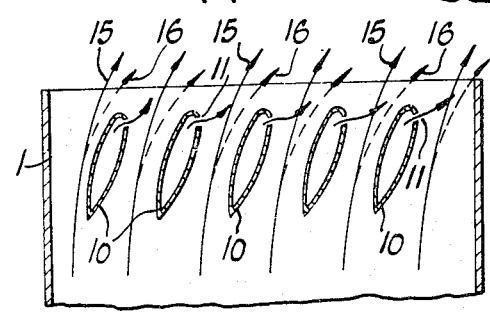
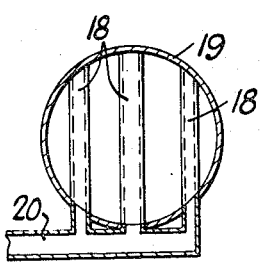
FIG.6.
INVENTORS
D. S. BLISS
J. T. EVEREST
BY
Cameron, Kerkam + Sutton
ATTORNEYS

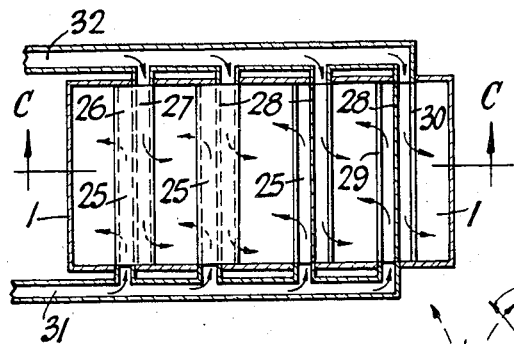
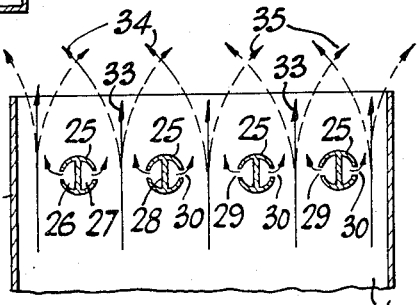
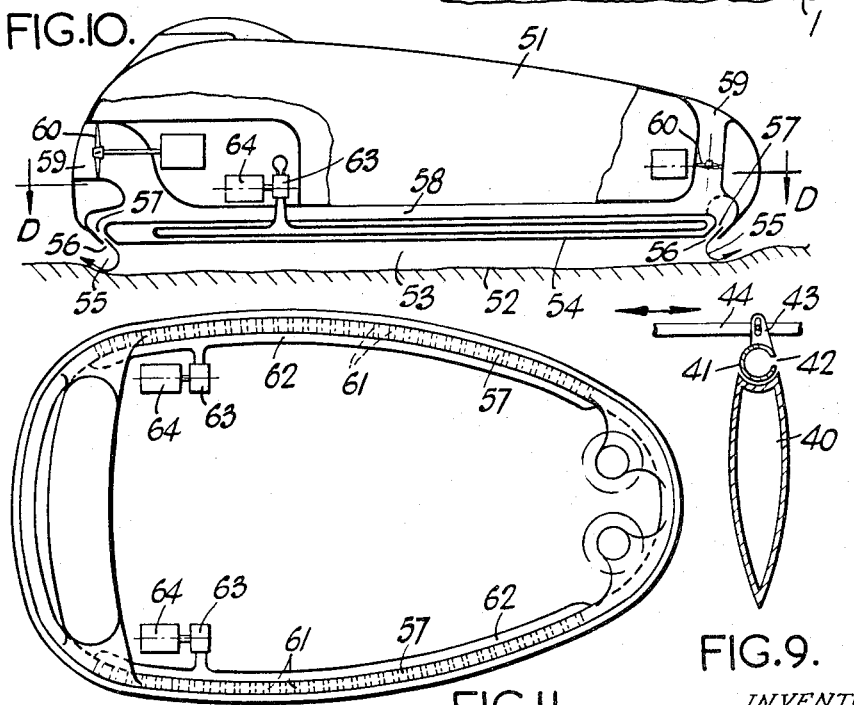

United States Patent Office 3,172,495
Patented Mar. 9, 1965

3,172,495
CONTROL OF FLUID CURTAIN FLOW IN AIR CUSHION VEHICLES
Denys Stanley Bliss, Ashurst, Southampton, and Julian Thomas Everest, South Darenth, near Dartford, England, assignors to Hovercraft Development Limited, London, England, a British company
Filed Dec. 28, 1962, Ser. No. 248,054
Claims priority, application Great Britain Jan. 3, 1962, 310/62
4 Claims. (Cl. 180—7)

This invention relates to the variation of the direction of flow of a moving fluid.

It has been proposed to vary the direction of the flow of a fluid by providing one or more deflecting vanes, the position of the vanes being varied to vary the deflection of the fluid flow. Whilst such arrangements are suitable for many applications, it is sometimes inconvenient to use mechanically movable members and their associated control and actuating mechanism, especially where large numbers of such members are required and particularly if they are mounted in a position where damage to them is likely to occur.

A typical installation where a large number of deflecting vanes is likely to be required and where damage is possible is in a vehicle of the type which in operation is supported in spaced relationship to a surface by one or more cushions of pressurized gas formed and contained beneath the vehicle, the cushion or cushions being contained for at least part of the periphery by one or more curtains of fluid issuing in a downward direction from supply ports formed in the bottom of the vehicle. In such vehicles it has been proposed to provide movable vanes in the ducts leading to the supply ports, the vanes being positioned adjacent to but upstream of the supply ports. The vanes may be turned so as to deflect the curtain-forming fluid to give it horizontal components of motion which provide propulsive and/or steering thrusts for the vehicle. These vanes are in a vulnerable position as they are liable to damage by debris, and, when operating over water, also by waves.

According to the invention there is provided apparatus for varying the direction of flow of a fluid in a duct, comprising a member extending across the duct and means for ejecting from said member into the path of the said fluid at least one jet of fluid having at least a component of direction of flow transverse to the direction of fluid flow in said path so as to intercept and deflect the flow of fluid therein. The fluid, the direction of flow of which is to be varied, and the fluid ejected transverse to this flow may be the same fluid or different fluids.

Normally it will be desirable to be able to vary the degree of deflection of the fluid flow through the duct and accordingly a feature of the invention comprises means for varying the mass flow of the jet of fluid ejected from said member. It may also be provided that the direction in which the jet of fluid is injected into the path of the controlled fluid can be varied.

The effectiveness of the jet of fluid can be increased by making the said member of aerofoil section and ejecting the fluid from the downstream edge of the aerofoil member, the chordwise dimension of the aerofoil member extending substantially parallel to the undeflected fluid flow path in the duct.

The invention will be readily understood by the following description of certain embodiments thereof, given in conjunction with the accompanying drawings in which:

FIGURE 1 is a plan view of a duct incorporating one embodiment of the invention, FIGURE 2 is a cross-section on the line A—A of FIGURE 1, FIGURE 3 is a plan view of a duct incorporating another embodiment of the invention, FIGURE 4 is a cross-section on the line B—B of FIGURE 3, FIGURE 5 is a plan view of a duct incorporating a further embodiment of the invention, FIGURE 6 is a plan view of a circular-duct incorporating the invention, FIGURE 7 is a plan view of a duct incorporating yet a further embodiment of the invention, FIGURE 8 is a cross-section on the line C—C of FIGURE 7, FIGURE 9 illustrates a modification of the embodiment illustrated in FIGURE 2, FIGURE 10 is a diagrammatic vertical cross-section, parallel to the fore and aft axis, of a vehicle embodying the invention, and FIGURE 11 is a cross-section on the line D—D of FIGURE 10.

In FIGURES 1 and 2 there is shown the outlet end of a duct 1 having a rectangular cross-section. Positioned across the duct are a number of members in the form of hollow-tubes 2 each having a port 3, in the form of a slot, extending along the side of the tube. The tubes 2 are positioned across the duct substantially normal to the flow in the duct and the ports 3 are positioned in the tubes so as to face in a direction which is again normal to the flow in the duct. The ends 4 of the tubes 2 connect with a duct 5 through which a fluid under pressure can be supplied to the tubes.

When no fluid is supplied to the tubes 2, the flow through the duct 1 is in a substantially straight path, as indicated by the dotted arrows 6. When fluid is supplied to the tubes it issues from the ports 3, as indicated by the arrows 7. As a result of the flow of fluid from the ports the flow of fluid through the duct 1 is deflected, the resultant flow path being somewhat as indicated by the arrows 8. By varying the mass flow of fluid supplied to the tubes 2 and thus the mass flow of fluid issuing from the ports 3, the degree by which the flow in the duct is deflected can be varied.

FIGURES 3 and 4 illustrate an arrangement in which fluid is ejected from ports adjacent to the downstream edges of hollow members of aerofoil cross-section. The hollow aerofoil members 10 are positioned across the duct 1, in a similar manner to the tubes 2 in FIGURES 1 and 2. The members are arranged so that their chords are substantially parallel to the undeflected flow path of the fluid through the duct. Ports 11 are formed in one surface of each member adjacent to the downstream edges 12. The action of ejecting a fluid from the ports acts to deflect the fluid flowing through the duct, the deflection being enhanced due to the jets acting as jet flaps. Due to the jets acting as jet flaps there is a deflecting effect by the aerofoil members as occurs for an aircraft wing with jet flaps. The flow of fluid has a final direction as indicated by arrows 13. Fluid is fed to the aerofoil members 10 via a duct 14.

It is also possible to position the aerofoil members in the duct with an initial fixed inclination so as to provide a deflection of the fluid flow, additional fluid being ejected from ports when additional deflection is required. FIGURE 5 illustrates such an arrangement, the aerofoil members 10 being inclined to produce an initial deflection as indicated by the arrows 15. When fluid is fed to the aerofoil members 10 and issues through the ports 11, the flow through the duct 1 is further deflected as indicated by the arrows 16.

FIGURE 6 illustrates the application of the invention to a cylindrical duct. Hollow members 18 are positioned across the duct 19, fluid being supplied via a duct 20.

The members 18 can be tubes as in FIGURES 1 and 2 or aerofoil members as in FIGURES 3 and 4.

In an alternative arrangement, it is possible to divide the members from which is ejected the fluid by internal partitions and to have opposed ports one on each side of the member. It is then possible to selectively feed fluid to one or other of the sets of ports to deflect the fluid flowing through the duct in one direction or the other.

This is illustrated in FIGURES 7 and 8. A number of members in the form of hollow tubes 25, somewhat as in FIGURES 1 and 2, extend across the duct 1. The interior of each tube is divided into two compartments 26 and 27 by a dividing wall 28 extending the length of the tube and parallel to the undeflected flow in the duct 1. Ports 29 and 30 are formed in the tube one along each side of the tube communicating with compartments 26 and 27 respectively. Fluid is supplied to the tubes 25 via ducts 31 and 32, positioned one on each side of the duct 1. Duct 31 connects with one compartment, for example 26, in each tube and duct 32 communicates with the other compartment. The undeflected flow path of fluid through the duct 1 is indicated by arrows 33. By supplying fluid to the tubes 25 by either duct 31 or 32, the fluid flow in the duct is deflected in one direction or the other as indicated by the arrows 34 and 35 respectively.

Alternatively, instead of having opposed ports, as in FIGURES 7 and 8, the members can be movably mounted. For example, in the arrangement shown in FIGURES 3 and 4, each aerofoil member can be two parts, as illustrated in FIGURE 9. Each member comprises a stationary section 40, which forms the major part of the member, and a rotatably mounted tubular portion 41 in which is formed a port 42.

The rotatable portion 41 is connected by a link 43 to an operating rod 44 which is reciprocated by a lever in the driver's cabin.

FIGURES 10 and 11 illustrate diagrammatically a vehicle embodying the invention. The vehicle 51 is supported above a surface 52 by one or more cushions of pressurised air formed in the space 53 between the bottom 54 of the vehicle and the surface 52. The space 53 is bounded at its periphery by one or more curtains of moving air 55 issuing from a supply port 56 via a supply duct 57 from a main duct 58 which in turn is fed by air taken in through intakes 59 and energised by compressors or the like 60.

The vehicle is propelled and maneuvered by deflecting the air forming the curtain along the sides of the vehicle. Members 61, for example, as illustrated in FIGURES 1 and 2 are positioned across the supply duct 57 and air is fed to the members 61 via a duct 62 fed by compressors 63 driven by engines 64. The compressors normally supply air to the members 61 at a constant and equal mass flow to each side of the vehicle. This deflects the curtain forming air rearwards to propel the vehicle. For turning, the driver can vary the air flow to one side or the other, for example by slowing down one or other of the engines 64.

The fluid which is being deflected and the deflecting fluid can both be the same. In the vehicle described above, for example, both fluids may be air, or one may be a mixture of air and exhaust gases or a fluid such as water.

A fluid deflection means as described above is useful for deflecting fluids which contain suspended solid matter.

We claim:

1. A vehicle for travelling over a surface of the type adapted to be supported above that surface by at least one cushion of pressurised gas formed and contained beneath the vehicle at least in part by a curtain of moving fluid, comprising an elongated supply port in the bottom of the vehicle bounding the periphery of said cushion, a downwardly directed duct having a pair of side walls coextensive with the peripheral dimension of said supply port for supplying fluid to said supply port all along its length, means for delivering fluid for the formation of said curtain through said duct to said supply port, a plurality of jet ejecting members mounted within said duct at spaced points along the dimension thereof which is coextensive with said port, and means for delivering fluid to said jet ejecting members, said jet ejecting members extending across the duct between the side walls thereof and being so oriented as to eject jets of fluid into the stream of fluid flowing downwardly through said duct with at least a component of direction of flow in said jets which is transverse to the downward direction of flow of said stream and substantially parallel to the side walls of said duct.

2. A vehicle as claimed in claim 1 wherein said jet ejecting members are mounted for movement to vary the direction of ejection of said jets.

3. A vehicle as claimed in claim 1 including means for varying the mass flow of fluid delivered to said jet ejecting members.

4. A vehicle as claimed in claim 1 wherein each of said jet ejecting members is of aerofoil section, the chord of the section being substantially parallel to the undeflected flow path of the fluid stream flowing through said duct, and includes jet ejecting orifices adjacent that edge of the section which is downstream with respect to the flow of fluid through said duct.

References Cited in the file of this patent

UNITED STATES PATENTS

| 3,016,063 | Hausman | Jan. 9, 1962 |
| 3,080,886 | Severson | Mar. 12, 1963 |

FOREIGN PATENTS

| 1,258,780 | France | Mar. 6, 1961 |

OTHER REFERENCES

"Fluid Transistor Circuits May Rival Electronics," June, 1960, Science & Mechanics, pp. 81–84.